United States Patent
Moehring

(10) Patent No.: US 7,927,065 B2
(45) Date of Patent: Apr. 19, 2011

(54) WIND TURBINE WITH ADDITIONAL BLADE-END SUPPORT

(76) Inventor: Manfred Moehring, Gotha (DE)

( * ) Notice: Subject to any disclaimer, the term of this patent is extended or adjusted under 35 U.S.C. 154(b) by 8 days.

(21) Appl. No.: 12/552,646

(22) Filed: Sep. 2, 2009

(65) Prior Publication Data

US 2010/0040477 A1 Feb. 18, 2010

Related U.S. Application Data

(63) Continuation of application No. PCT/EP2008/052627, filed on Mar. 4, 2008.

(30) Foreign Application Priority Data

Mar. 5, 2007 (DE) .......................... 10 2007 010 561

(51) Int. Cl.
*F03D 11/00* (2006.01)
(52) U.S. Cl. .......... 415/4.3; 415/4.5; 415/228; 415/220; 415/173.1; 416/146 R; 416/244 R; 416/248
(58) Field of Classification Search .................. 415/4.3, 415/4.5, 228, 220, 173.2, 121.2; 416/146 R, 416/244 R, 248, 247 R; 290/44, 99
See application file for complete search history.

(56) References Cited

U.S. PATENT DOCUMENTS

| | | | |
|---|---|---|---|
| 1,233,232 A | 7/1917 | Heyroth | |
| 1,329,299 A | 1/1920 | Foster | |
| 4,720,640 A | 1/1988 | Anderson et al. | |
| 6,064,123 A * | 5/2000 | Gislason | 290/55 |
| 6,629,815 B2 * | 10/2003 | Lusk | 415/4.2 |
| 6,841,892 B1 | 1/2005 | Le Nabour et al. | |
| 7,276,810 B2 | 10/2007 | Moehring | |
| 7,503,747 B2 * | 3/2009 | Ikeda | 415/229 |
| 2003/0235493 A1 | 12/2003 | Keyvani | |
| 2006/0275121 A1 * | 12/2006 | Merswolke et al. | 416/132 B |

FOREIGN PATENT DOCUMENTS

| | | |
|---|---|---|
| DE | 2524360 A1 | 1/1977 |
| DE | 196 06 359 A1 | 8/1997 |
| DE | 198 51 735 A1 | 5/2000 |
| DE | 100 14 426 A1 | 10/2001 |
| DE | 202 13 062 U1 | 11/2002 |
| DE | 101 55 014 A1 | 5/2003 |
| DE | 10 2004 020835 A1 | 11/2005 |
| DE | 10 2004 020835 B4 | 11/2005 |

(Continued)

OTHER PUBLICATIONS

German Office Action for DE 10 2007 010 561.6 dated Jul. 7, 2008.

(Continued)

*Primary Examiner* — Ninh H Nguyen
(74) *Attorney, Agent, or Firm* — Jenkins, Wilson, Taylor & Hunt, P.A.

(57) ABSTRACT

The present invention relates to a wind power plant. It comprises a stator, a rotor, which is supported by the stator, a circular guide device, which has a plurality of fastening points provided on the periphery, at least two rotor blades, which each at the proximal end thereof are rotatably supported on the rotor and with the distal end thereof are rotatably supported by the annular guide device, and a plurality of tensioning ropes, which under tension connect the fastening points of the circular guide device to the stator for stable holding of the circular guide device in a position that is concentric to the rotor.

13 Claims, 5 Drawing Sheets

FOREIGN PATENT DOCUMENTS

| | | |
|---|---|---|
| DE | 10 2005 023120 B3 | 11/2006 |
| EP | 0033176 A2 | 8/1981 |
| FR | 699 19 409 T2 | 8/2005 |
| WO | WO 2008 107441 | 9/2008 |

OTHER PUBLICATIONS

International Search Report with Written Opinion for PCT/EP2008/052627 dated Sep. 8, 2008.

* cited by examiner

WIND TURBINE WITH ADDITIONAL BLADE-END SUPPORT

CROSS-REFERENCE TO RELATED APPLICATIONS

This application is a continuation of PCT International Application No. PCT/EP2008/052627 filed Mar. 4, 2008, which claims the benefit of German patent application No. 10 2007 010 561.6 filed Mar. 5, 2007, the entire disclosure of which is herein incorporated by reference.

FIELD OF THE INVENTION

The present invention concerns a wind power plant, based on the principle of a windmill, which can be used for energy supply purposes.

Although the present invention can be applied to any kind of wind power plant, its features and the underlying problem are herein described with respect to a large-scale construction of a wind power plant.

BACKGROUND OF THE INVENTION

Wind power plants of this type are suitable for covering a portion of the power that is required by all consumers. In the future, they will also serve to generate hydrogen, in addition to oxygen, through hydrolysis of water. Through electricity generated by means of fuel cells in motor vehicles, the hydrogen will replace the existing types of vehicle fuel: gasoline, diesel or natural gas. Furthermore, for countries currently producing petroleum and natural gas, which are at present not living with a high level of technology, the installation of large-scale wind power plants with greater capacity, inter alia, based on earnings from their petroleum and natural gas business, is an important issue with respect to securing and improving their future existence when the natural resources are exhausted.

Worldwide, windmills with a horizontal axis have become widespread. Most of them have three rotor blades or rotor vanes fastened to the rotor which subsequently delivers the energy generated by wind power to a small nacelle with gear box, braking device, generator and control devices. These installations are supported on towers by means of a slew ring and are operated via control equipment.

Due to an overproduction of electricity from nuclear power plants and fossil fuel plants, the current three-blade wind power plants are only exploited to a small extent which means they are temporarily switched off at the request of power distribution companies, although there is sufficient wind energy available. Already today, it would be necessary to collect the entire energy available from wind power plants, keep it for a certain time in storage-type facilities or convert it into energy carriers such as hydrogen. Current procedures are likely to become obsolete with the introduction of large-scale wind power plants. In view of the imminent end of the world's carbon and hydrocarbon resources, the use of carbon, petroleum and natural gas for thermal utilization, also in motor vehicles, should urgently be prohibited by global conventions ahead of time, and this prohibition should actually be enforced so the international chemical and metallurgical industry will have these important resources at its disposal for a longer period of time. Not till then will electricity from alternative and renewable energies become the most important source of electricity. Large-scale wind power plants of a size mentioned above can serve as an important pillar of support in the reorganization of global energy consumption and its implementation.

Although the wind power plants presently existing in Germany generate a considerable amount of electric energy, the portion of electricity that is obtained from alternative energy sources (wind, water, sun) accounts, on aggregate, for as little as 10% of total national power consumption.

With three-blade wind power plants according to the state-of-the-art, a disadvantage has become obvious: these three-blade wind power plants provide poor performance because their blades make use of an area exposed to the wind which is as small as approximately 60 $m^2$. Also their performance is limited by the circular area that is covered by the blades. The wind power plant setups which have been in use up to now impose restrictions on blade length and, hence, on the covered circular area, because the blade materials employed imply a certain maximum permitted strain level.

Within the state of the art one approach to a solution of this problem is found, which consists in enhancing the performance of the three-blade wind power plants by enlarging the rotor blade dimensions in length and width.

However, this approach has exposed a disadvantage inasmuch as currently available composite materials such as glass fibers and synthetic resin do not permit a significant increase in the dimensions of the rotor blades, because an increase in weight will compete against the requirements with respect to stability, thus adversely affecting or even excluding stability. The alternative of broadening the rotor blades in those zones where, according to the state of the art, they exhibit a more pointed shape in order to increase the wind absorption capacity equally fails to meet stability requirements, because a considerable increase in weight must be expected also in this case.

It is therefore the task of the present invention to create a wind power plant having an enhanced performance as a result of a greater absorption of wind power than those provided by current state-of-the-art approaches.

According to the invention, this task is accomplished by a wind turbine with the features of patent claim 1. Accordingly, the wind turbine comprises:
- a stator;
- a rotor, which is supported by the stator;
- a circular guide device, which has a plurality of fastening points provided on the circumference;
- at least two rotor blades, each of which is rotatably supported at its proximal end on the rotor and at its distal end by the circular guide device, and
- a plurality of tensioning ropes, which under tension connect the fastening points of the circular guide device to the stator for stably holding the circular guide device in a position that is concentric to the rotor.

A strong bearing section is created for the distal end of the rotor blades or rotor blade heads which are rotatably supported to allow rotation along a circular path around the rotor unit. This additional support of the distal ends of the rotor blades by means of a circular or annular guide device or ring support element allows to design the individual rotor blades with a greater length, which is, without restricting the scope of the subject-matter to be protected, expected to be twice the length of approximately 100 m or longer, with greater width and increased weight. Moreover, several rotor blades with narrowed proximal ends can be connected to the rotor unit, because, unlike state-of-the-art devices, the rotor unit does not have to carry the whole weight of the rotor blades, and hence a tapered bearing section is sufficient. Because the rotor blade ends are movably supported and guided along a circular path by the stationary circular guide device, the forces of the individual rotor blades are transmitted to the rotor axis as a torque and—amongst other possibilities—can be transformed into an electric current by a generator in the nacelle. As an additional option, a greater number of rotor blades than typically three at present may be installed on this wind power plant. Furthermore, the width of the state-of-the-art tapered distal ends of the rotor blades can be enlarged.

The guide device is kept in a concentric position in relation to the rotor axis by the plurality of tensioning ropes. The forces acting on the guide device in a direction parallel to the rotor axis, are transferred to the stator via the plurality of tensioning ropes.

In one embodiment of the invention, the stator comprises at least one first securing anchor in the direction of an axis of the rotor in front of the rotor blades and at least one second securing anchor in the direction of the axis of the rotor behind the rotor blades and a first subset of the plurality of tensioning ropes is attachable to the at least one first securing anchor and a second subset of the plurality of tensioning ropes is attachable to the at least one second securing anchor.

In another embodiment, the wind turbine is provided comprising a nacelle casing that forms part of the stator, wherein the at least one first securing anchor is arranged on the nacelle casing.

According to a further advancement, the wind turbine comprises a body forming part of the stator and supported on the rotor in a freely rotatable manner, wherein the at least one second securing anchor is arranged on the body.

In one embodiment, the nacelle is pivot-mounted for swivel motion in the horizontal plane.

The nacelle may be mounted on a column.

One embodiment provides for a trolley body arranged at the distal end of the rotor blades, which runs in a circular guide device.

According to a further advancement, the trolley body comprises at least one rolling body on its surface that is supported on the circular guide device.

The circular guide device may be conceived as a ring-shaped hollow rail configuration that encloses the trolley body.

In one embodiment, the trolley body is connected under tension with the distal end of the rotor blades via an elastic mounting suspension, and the tension force which is applied to a rotor blade by the elastic mounting suspension is adjustable.

According to a further advancement, the trolley body is composed of several trays comprising ball-bearing cages and arranged in a fashion such as to be mutually shifted in the axial direction.

In one embodiment, the elastic mounting suspension is provided in a manner to be coupled to an axis that supports ball-bearing cage trays which are arranged such as to be mutually shifted in the axial direction.

Each ball-bearing cage tray may comprise several rolling bodies supported on its outer surface.

BRIEF DESCRIPTION OF THE DRAWINGS

Preferred embodiments of the invention are illustrated in the figures of the drawings and explained in more detail in the description below with reference to the figures. The figures show.

Identical reference numerals in the figures of the drawings designate identical components or components of identical function.

DETAILED DESCRIPTION OF THE INVENTION

Figure 1:
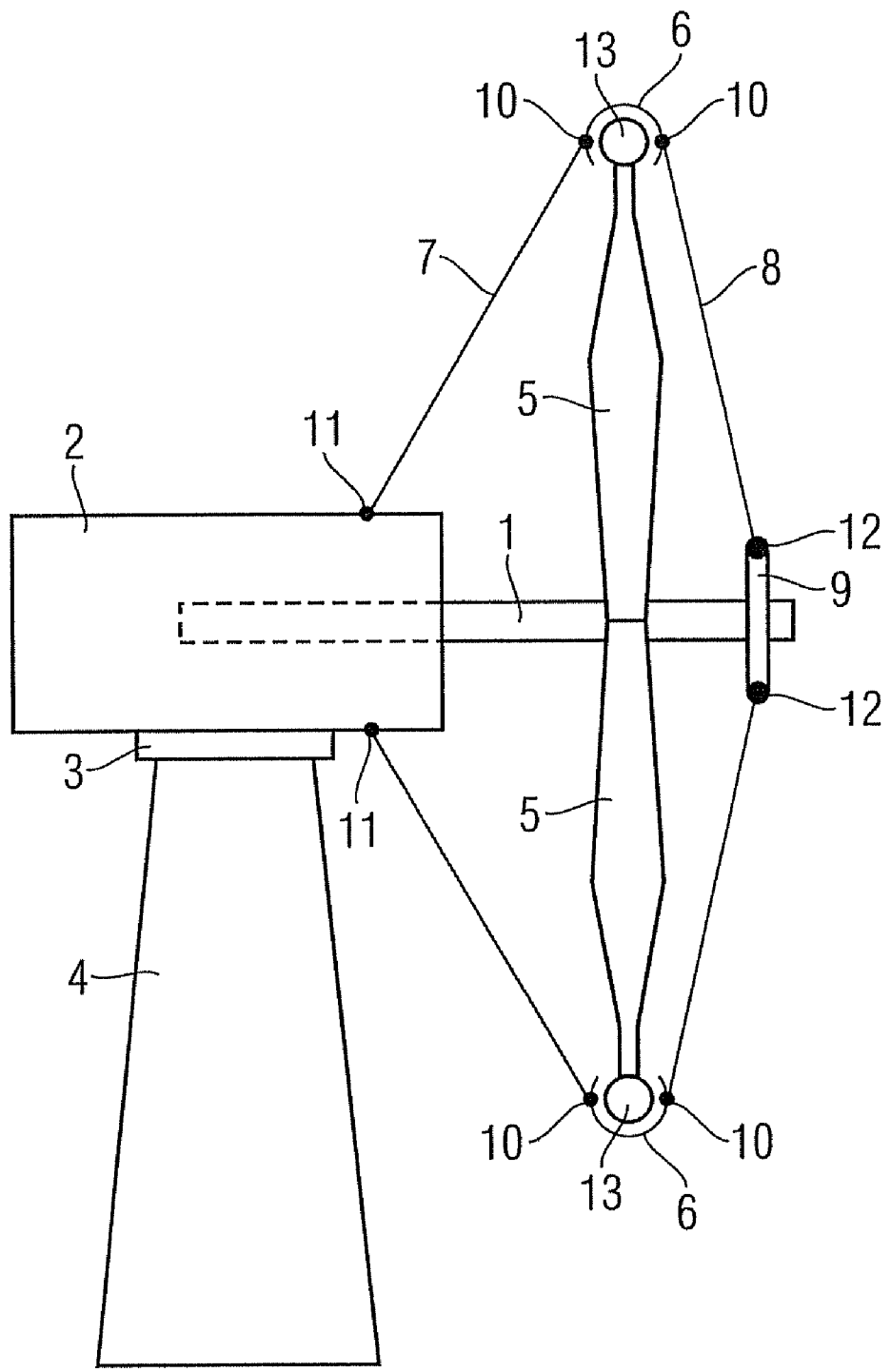
FIG. 1: A lateral view of a wind turbine according to one embodiment.
Figure 2:
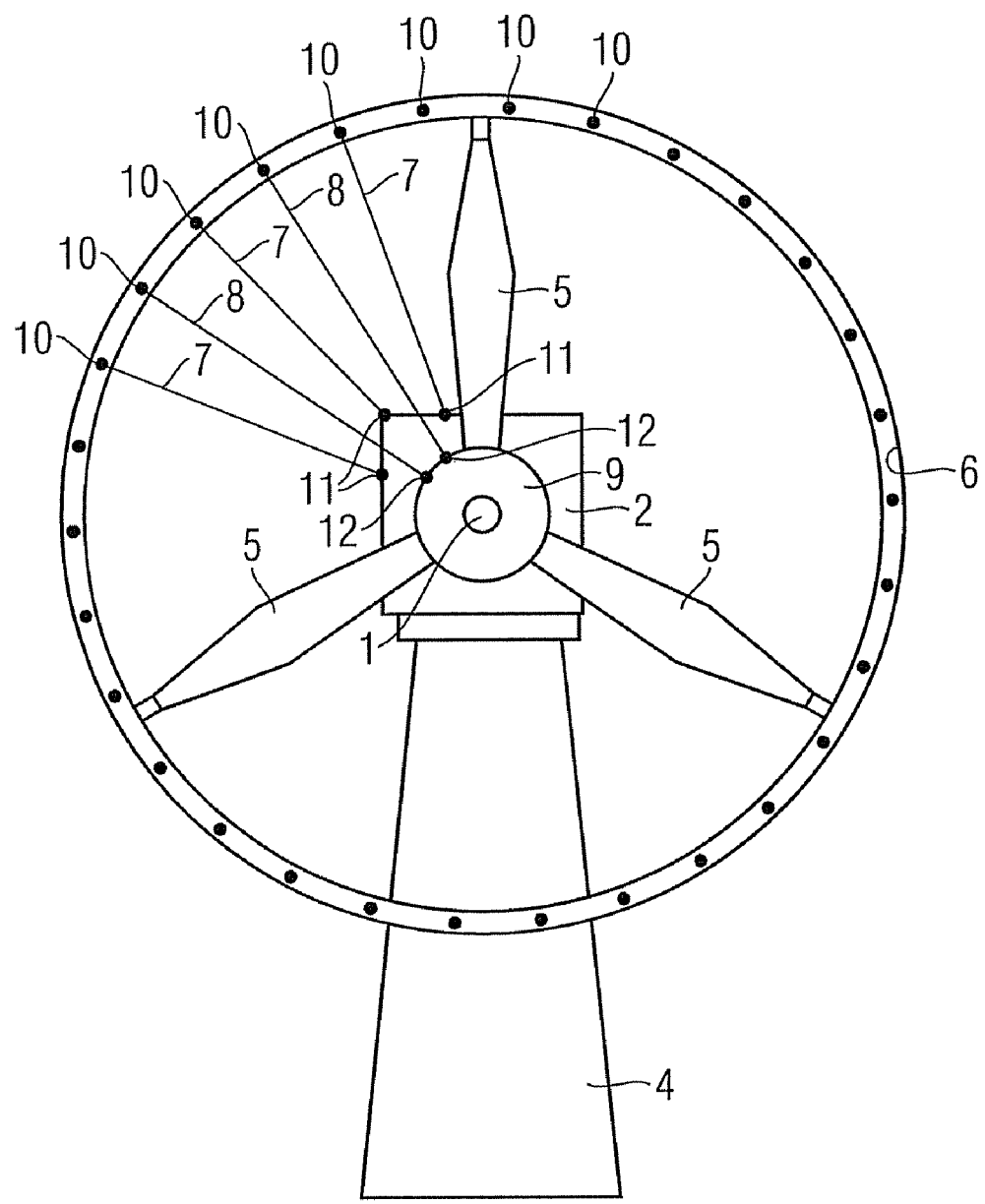
FIG. 2: A front view of the wind turbine according to FIG. 1.

FIGS. 1 and 2 illustrate a wind power plant according to a first embodiment in a front view and a lateral view.

A rotor 1 is supported in a way to allow rotation around an axis. Preferentially, the axis is essentially parallel to the surface of the Earth. The rotor 1 extends into a nacelle 2. The nacelle contains, among other items, the bearings that are required to guide the rotor. A generator for production of electric current or other energy consumers, for example mechanical water pumps, are coupled to the rotor 1 inside the nacelle 2 for power supply. The nacelle casing 2 is supported on a rotary table 3. The rotary table 3 allows a rotation of the nacelle around an axis that is essentially perpendicular to the surface of the Earth. This allows the nacelle with the rotor 1 to be aligned in a desired cardinal direction. A suitable drive unit turns the rotary table 3 or the nacelle 2 in relation to the rotary table 3. The drive unit may be coupled to a sensor for determination of the direction of wind. Responding to the sensor's signals, the rotor 1 is then aligned to face the direction of wind.

The rotary table 3 with nacelle 2 is arranged on a base 4. Typically, the base 4 is designed as a column-like construction. The base 4 is firmly embedded in the ground.

Attached to rotor 1 are several rotor blades 5. Preferentially, two, three or four rotor blades or rotor vanes are arranged on the rotor 1. However, the present invention is not limited to this small number of rotor blades 5. It allows more rotor blades to be coupled to rotor 1. Each rotor blade 5 is at its proximal end coupled to the rotor 1, in order to transmit a wind force acting on the rotor blades 5 to the rotor in the form of a torque.

As shown in FIG. 2, the rotor blades 5 may feature a tapered shape towards their distal ends. At their proximal end, they are preferentially narrow for coupling them to the rotor 1. The rotor blades 5 may also be configured in a variety of other shapes.

The rotor 1 or the suspension of the rotor blades 5 on the rotor 1 may comprise an actuating device that is capable of tilting the rotor blades 5 around their longitudinal axis. Combined with a wind speed device or an appropriate control device, the actuating device provides the rotor blades 5 with an angle of attack with respect to the wind such that an optimal efficiency ratio is achieved. In case of winds of great strength or when the wind turbine is shut down for preventive maintenance, the blades can be aligned to face the wind with their narrow side.

The rotor blades 5 and the materials used for them have a limited mechanical load-bearing capacity. Exposed to the wind, the rotor blades experience a force that deforms the rotor blades 5 in the axial direction of the rotor 1. For mechanical stabilization of the rotor blades 5, the wind turbine provides for bearing support of their distal ends in a guide device 6, in order to transmit the rotary forces to the rotor axis of rotor 1. Each of the rotor blades 5 is thus supported at its proximal end and at its distal end. This reduces the mechanical load on the rotor blade 5. Material fatigue effects, especially in the area where the rotor blades 5 are coupled to the rotor 1, are diminished. Consequently, the support of the rotor blades 5 allows to install rotor blades 5 having a greater length. Thereby, the level of power output of the wind turbine, which depends on the area covered by the rotor blades 5, can be increased.

According to the embodiment shown in FIG. 1, the guide device 6 consists of a hollow rail that is bent into a circle or assembled from multiple individual pieces, for example by welding. The guide device 6 is held in position by means of tensioning ropes 7, 8. A first subset of tensioning ropes 7 connects the guide device 6 with the nacelle 2. The tensioning ropes 7 are in tensioned state. Each individual tensioning rope 7 is tightened with a different force in order to raise the guide device 6 against gravity, while keeping it concentric with the rotor 1 at the same time. A second subset of tensioning ropes 8 connects the guide device 6 with a plate 9. Preferentially, plate 9 is pivot-mounted on the rotor 1. Plate 9 is arranged at that end of rotor 1 which has a certain offset against the nacelle 2. Hence, looking in the direction of wind, the tensioning ropes 8 are located in front of the rotor blades 5. The first subset of tensioning ropes 7, by contrast, is located behind the rotor blades 5. The second subset of tensioning ropes 8 are also adjusted, in terms of force application, in such a manner as to hold the guide device 6 concentric in relation to the rotor 1. Besides, the forces acting along the axis of the rotor 1, which are induced by the first subset of tensioning ropes 7 and the second subset of tensioning ropes 8, compensate each other. FIG. 2 provides a schematic view of five of these tensioning ropes. All around its circumference, the guide device 6 provides fastening points 10 preferentially spaced equally for the tensioning ropes 7, 8. First securing anchors 11 are provided on the nacelle 2. The first securing anchors 11 are connected with the fastening points 10 by the tensioning ropes 7. Second securing anchors 12 are arranged on the plate 9. These are connected with the fastening points 10 on the guide device 6 by the second subset of tensioning ropes 8.

Plate 9 is fastened in such a manner that it will not follow the rotation of rotor 1. This can be guaranteed, firstly, by pivot-mounting it to the rotor 1. Secondly, it is possible to conceive the rotor 1 as a hollow tube that contains a non-rotating core. In this case, the plate 9 is attached to the non-rotating core.

Figure 3:
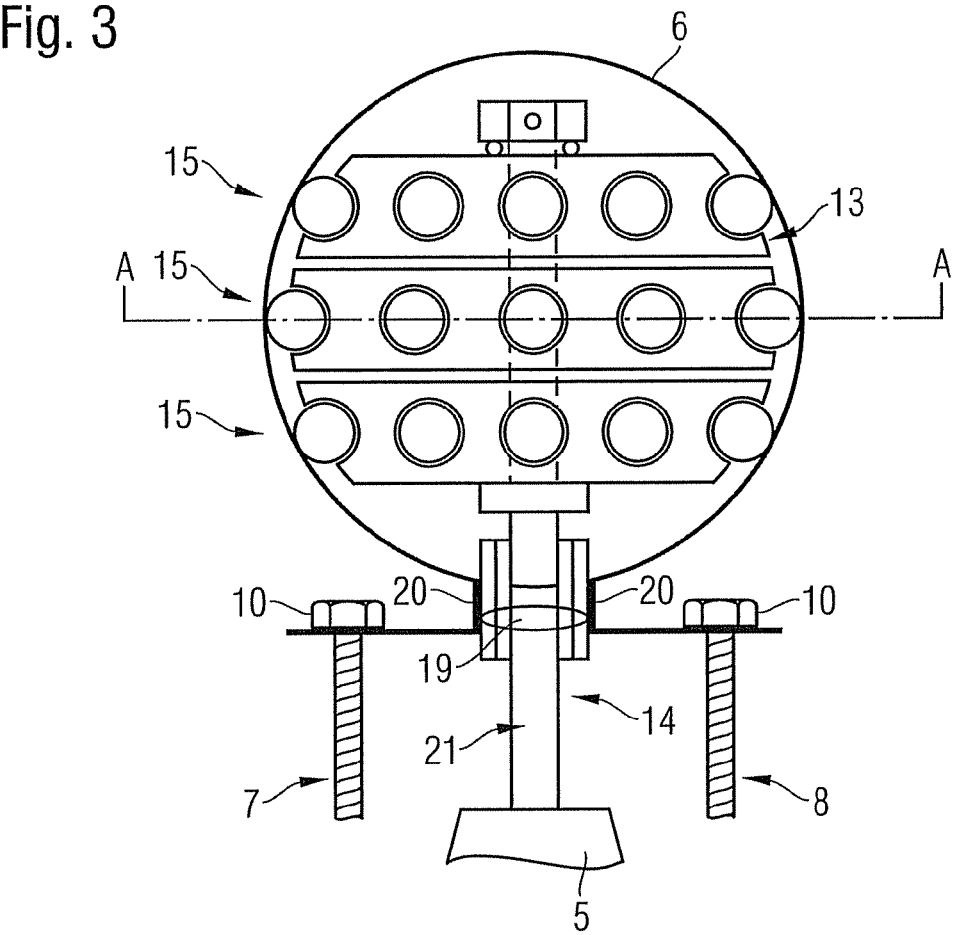
FIG. 3: A lateral view of a trolley body of the wind turbine.

Located on the distal end of the rotor blades 5 is a trolley body 13. In a preferred embodiment, the trolley body 13 is enclosed by the hollow rail. FIG. 3 provides a detail view of the trolley body 13, showing how it is situated and supported inside of the hollow rail 6. Conceived as a running path, the hollow rail 6 features an almost fully closed profile, except for a slot in a direction towards the axis. A bracing device 14 links the distal end of a rotor blade 5 to the trolley body 13. The bracing device 14 is guided by the slot. For frictionless guidance of the bracing device, rolling bodies 20 in the form of ball or needle bearings can be arranged in the slot 19.

Figure 4:
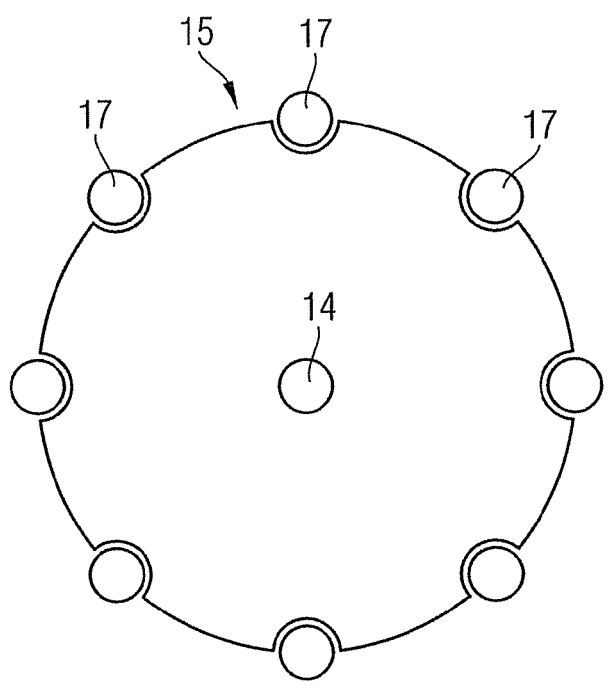
FIG. 4: A sectional view of plane A-A in FIG. 3.

The trolley body 13 is adapted with respect to its circumference to the hollow rail of guide device 6. In the preferred embodiment described herein, the trolley body is composed of several ball-bearing cage trays 15 which are supported by the bracing device 14 such as to be freely rotatable (FIG. 4).

The bracing device 14 preferentially comprises a spring element 21. The spring element 21 creates a resilient force that clamps a blade between the rotor 1 and the guide device 6. Expediently, the resilient force of the bracing device 14 can be adjusted so that different thermal stress levels can be compensated depending on the temperatures, which are recorded by sensors. The guide device may be manufactured from a single piece of rolled chromium steel sheeting with an approximate thickness of 1.5 mm. Once rolled, the sheeting material can be wound into spirals of approximately 10 m diameter and welded together on-site during installation of the wind turbine. The inner diameter of the hollow rail should be about 6 to 7 cm. The remaining slot has an approximate width of 2 cm. Small slot-like holes for draining of liquid may be provided at the lower half-ring of the guide device, ideally within the area that is not contacted by the balls.

In the near-slot area, lip-shaped reinforcement pads are provided at a right angle. On these lip-shaped reinforcement pads, the fastening points for the tensioning ropes may be arranged.

The tensioning ropes preferentially represent a stranded bunch of high-grade tempered, high-tensile stainless steel wires.

Figure 5:
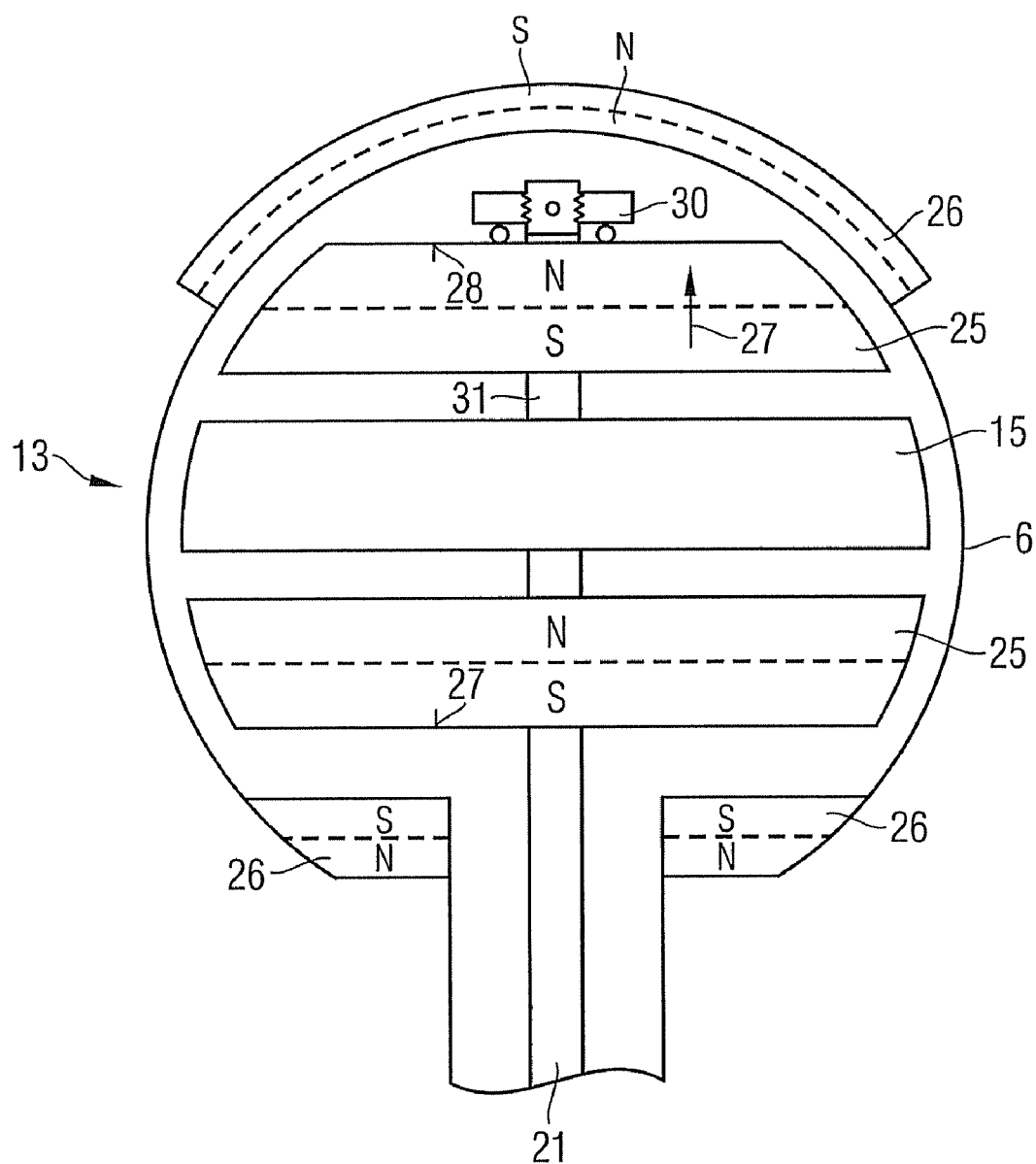
FIG. 5: A detail view of another embodiment.

FIG. 5 shows a cross-sectional detail view of another embodiment of the wind turbine. As in the previous embodiments, the guide device 6 may be conceived as a ring-shaped hollow rail. A trolley body 13 inside of the ring-shaped hollow rail 6 is able to move freely. The rotor blades (not shown) are coupled to the trolley body 13, for example through a spring element 21. As in the previous embodiments, the trolley body 13 may be composed of several ball-bearing cage trays 25 that are installed with a certain mutual spacing in the axial direction. The ball-bearing cage trays 15, 25 can be pivot-mounted on a bearing axis 31 that extends from spring element 21.

As described in more detail below, the trolley body 13 is magnetized, with one direction of polarization 27 extending parallel to the rotor blades 5, i.e. in radial direction of the rotor 1. In the example shown on FIG. 5, the two outer ball-bearing cage trays 25 are magnetized in addition. The magnetization state is indicated through representative letters: N for North pole and S for South pole. Magnetization can be accomplished by magnetization of a special steel or by embedding ceramic permanent magnets.

Consequently, the trolley body 13 features two magnetized facets 27, 28 mutually opposite in the radial direction of the rotor 1.

A further set of permanent magnets 26 is fixed to the guide device 6. The permanent magnets 26 are located in positions opposite the magnetized facets 27, 28. The permanent magnets 26 are oriented in such a manner that they repel the facets 27, 28. As a result of these repelling forces, the trolley body 13 is kept "levitating" inside the guide device 6.

The trolley body 13 is arranged on the bearing axis 31. The trolley body 13 is secured to the bearing axis 31 by means of a nut or a cotter pin 30. The nut 30 may also be replaced with a ball-bearing ring to secure the trolley body 13.

Figure 6:
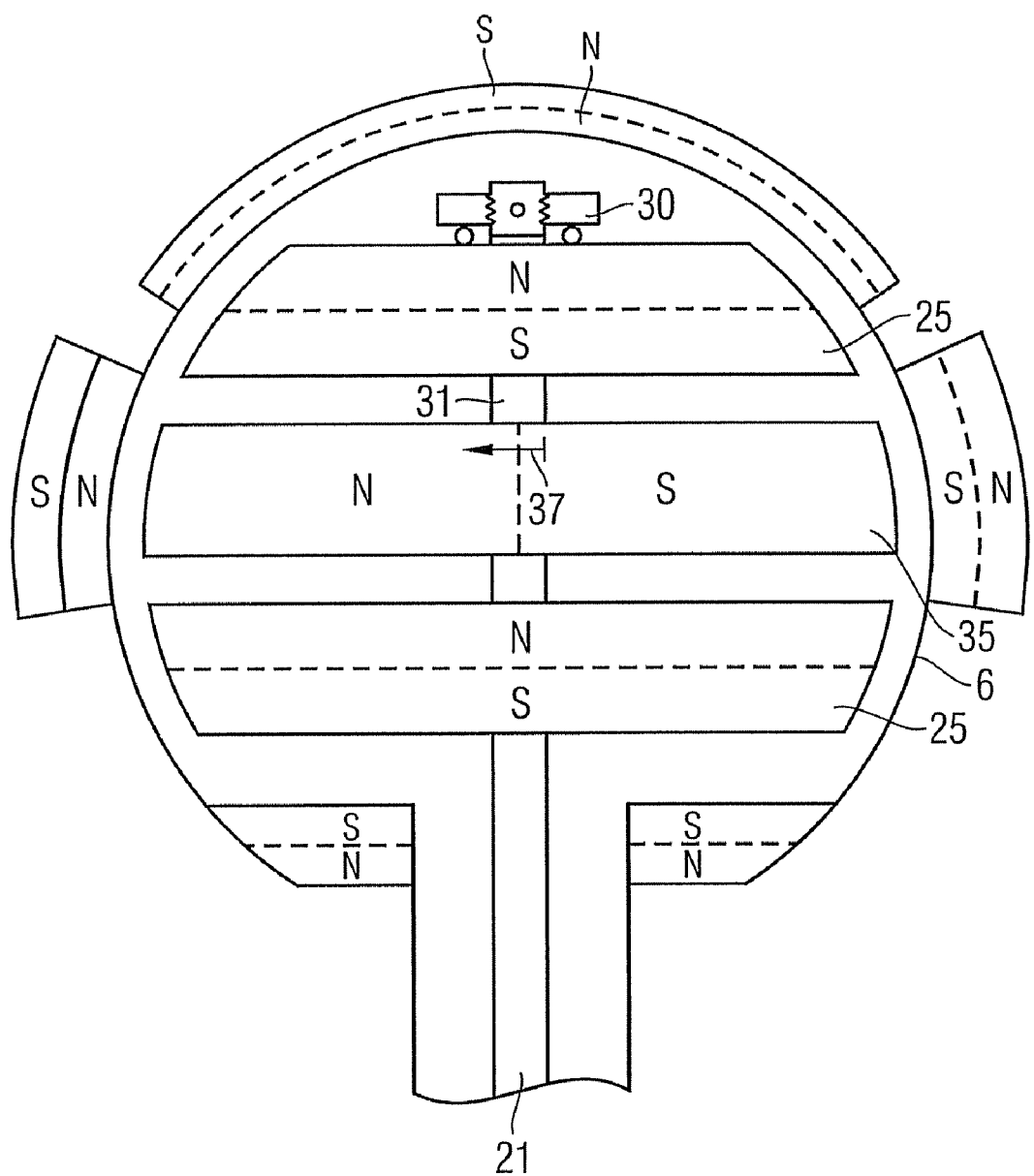
FIG. 6: A detail view of yet another embodiment.

FIG. 6 shows a modification of the embodiment described previously. One of the trays 35 of the trolley body 13 has a rigid connection with a rotor blade 5 or with an intermediate spring element 21, respectively. This tray 35 is unable to rotate around the axis of the spring element 21. The tray 35 is designed as a bar magnet with a magnetic orientation 37 that is perpendicular to the axis of the spring element or perpendicular to the rotor blade 5. Its magnetic poles are again marked with N and S by way of example. Permanent magnets are arranged on either side of the bar magnet 35 in a position opposite to each of the two bar magnet poles. The permanent magnets 36 are oriented to repel each the bar magnet 35, thus equally keeping the trolley body 13 in a "levitating" state. The magnetic forces diminish the contact pressure or altogether prevent contact of the trolley body 13 with the lateral wall of guide device 6.

What is claimed is:
1. Wind turbine comprising:
a stator;

a rotor, which is supported by the stator;
a circular guide device, which comprises a plurality of fastening points provided on its circumference;
at least two rotor blades, which are each rotatably supported at their proximal end on the rotor and at their distal end by the circular guide device;
a plurality of tensioning ropes, which under tension connect the fastening points of the circular guide device to the stator for stably holding the circular guide device in a position that is concentric to the rotor; and
a trolley body located at the distal end of the rotor blades and engaging with the circular guide device; wherein
the trolley body is formed from several ball-bearing cage trays arranged in a manner such as to be mutually shifted in the axial direction.

2. Wind turbine according to claim 1,
wherein
the stator comprises at least one first securing anchor arranged in the direction of an axis of the rotor in front of the rotor blades and at least one second securing anchor arranged in the direction of the axis of the rotor behind the rotor blades, and that a first subset of the plurality of tensioning ropes is attachable to the at least one first securing anchor and a second subset of the plurality of tensioning ropes is attachable to the at least one second securing anchor.

3. Wind turbine according to claim 2,
wherein
the wind turbine comprises a nacelle, which forms part of the stator, wherein the at least one first securing anchor is arranged on the nacelle.

4. Wind turbine according to claim 3,
wherein
the nacelle is pivot-mounted for swivel motion in the horizontal plane.

5. Wind turbine according to claim 3,
wherein
the nacelle is mounted on a column.

6. Wind turbine according to claim 2,
wherein
the wind turbine comprises a body, which forms part of the stator and is supported on the rotor in a freely rotatable manner, wherein the at least one second securing anchor is arranged on the body.

7. Wind turbine according to claim 1,
wherein
the trolley body comprises a plurality of rolling bodies on the surface that is supported on the circular guide device.

8. Wind turbine according to claim 1,
wherein
the circular guide device is formed as a ring-shaped hollow rail for enclosing the trolley body.

9. Wind turbine according to claim 1,
wherein
the trolley body is connected under tension to the distal end of the rotor blades via an elastic mounting suspension and that the tension force which the elastic mounting suspension applies to the rotor blade is adjustable.

10. Wind turbine according to claim 9,
wherein
the elastic mounting suspension is coupled to an axis that supports ball-bearing cage trays which are arranged in a manner such as to be mutually shifted in the axial direction.

11. Wind turbine according to claim 1,
wherein
each ball-bearing cage tray comprises rolling bodies supported on its outer surface.

12. Wind turbine according to claim 1,
wherein
the trolley body and the circular guide device each comprise mutually opposite magnetized areas that repel each other.

13. Wind turbine according to claim 12,
wherein
the magnetized areas are arranged in such a manner that the repelling magnetic forces keep the trolley body in a centered position inside the guide device.

* * * * *